United States Patent [19]

Haeder et al.

[11] Patent Number: 4,632,158
[45] Date of Patent: Dec. 30, 1986

[54] POWER LIMITING HYDRAULIC SYSTEM

[75] Inventors: Thomas Q. Haeder; Wally L. Kaczmarski, both of Lisbon, N. Dak.

[73] Assignee: Clark Equipment Company, South Bend, Ind.

[21] Appl. No.: 761,265

[22] Filed: Aug. 1, 1985

[51] Int. Cl.⁴ .............................................. A01G 23/08
[52] U.S. Cl. .................... 144/34 E; 91/517; 91/518; 91/450; 91/459; 144/339
[58] Field of Search ............ 144/34 E, 3 D, 339; 91/517, 518, 450, 451, 459

[56] References Cited

U.S. PATENT DOCUMENTS

| | | | |
|---|---|---|---|
| 3,760,689 | 9/1973 | Johnston | 91/518 |
| 3,902,538 | 9/1975 | Muirhead | 144/34 |
| 4,039,010 | 8/1977 | Tucek | 144/34 |
| 4,083,291 | 4/1978 | Larsson | 91/412 |
| 4,313,479 | 2/1982 | Coughran, Jr. | 144/34 E |
| 4,387,752 | 6/1983 | Tyer | 144/34 E |

Primary Examiner—W. D. Bray
Attorney, Agent, or Firm—Kenneth C. Witt; John C. Wiessler

[57] ABSTRACT

The hydraulic system of this invention is for operating a tree processing implement on a work vehicle so that during a first part of an operating cycle the implement is supplied by two hydraulic pumps jointly, while during another part of the operating cycle the implement is supplied by only one of the pumps. The result is that during the first part of the cycle the implement moves rapidly but during the other part it moves slowly.

6 Claims, 2 Drawing Figures

POWER LIMITING HYDRAULIC SYSTEM

BACKGROUND OF THE INVENTION

1. Field of the Invention

This invention relates to a dual purpose power limiting hydraulic system for carrying out two functions in the operation of an implement on a work vehicle, such as, a felling head on a tree harvesting machine.

2. Description of the Prior Art

U.S. Pat. No. 3,902,538 Muirhead shows a control system utilizing two different size pumps driven by a motor, for controlling a felling head which has a grabber or accumulator, and a cylinder for advancing the rotary cutter. The larger pump drives the cutter and has a valve which through a pressure sensing mechanism controls the speed of the cutter. A relief valve is preset to open at about 2200 PSI while another valve is opened only when it is necessary to vent the relief valve and thereby bring the cutter to a halt. The smaller capacity pump supplies pressurized fluid to the grabber arms and the cylinder.

U.S. Pat. No. 4,039,010 Tucek shows a hydraulic circuit for a tree harvesting implement having a cutter mounted on a movable frame with a hydraulic ram moving the frame and a hydraulic motor driving the cutter. The hydraulic circuit includes two separate pumps with one pump connected to one end of the fluid ram and the second pump connected to the hydraulic motor as well as the opposite end of the fluid ram with both conduits having pressure relief valves which are settable so that the frame is moved as a function of the resistance encountered by the cutter and/or the movable frame. As shown the second pump is driven by a motor which is driven by the first pump, but in the patent it is pointed out that both pumps can be driven directly from a single power source.

U.S. Pat. No. 4,083,291 Larsson shows a control system for a tree cutting implement which utilizes a chain saw. The motor of the saw is operated by a pump through a conduit. Another pump supplies pressurized fluid, through a flow divider, for operating feed cylinders which move the saw into the tree. When the pressure in the conduit to the motor rises above a predetermined amount such condition is signaled by electronic control apparatus which changes the position of the control valve to reduce the speed of flow in the conduit and thus slow down the rate of movement of the feed cylinders to the next lower preselected speed.

Some prior art tree processing implements are deficient in that only one pump supplies hydraulic fluid to the hydraulic cylinders. The size of the pump is chosen to be a compromise between rapid cylinder travel and limiting excess power consumption. High hydraulic flow at high pressure translates into heat, and thus inefficiency, when the limit of the pressure is determined by a relief valve.

Also in the prior art, pressure compensated variable displacement pumps have been used to accomplish rapid cylinder travel at low pressure while travel is slowed for high pressure conditions. These systems are deficient in that their cost is often higher than is considered acceptable. Furthermore, in such systems, the entire flow is at the highest pressure required by any function, which results in power waste during simultaneous hydraulic functions.

Also in the prior art, two stage pumps have been employed to operate tree processing implements, however, the deficiency of such a system is that the flow from one pump is limited by a relief valve when a predetermined pressure is reached, thus wasting energy. Furthermore, the pump that relieves at a relatively low pressure is incapable of serving any hydraulic function that requires a greater pressure.

SUMMARY OF THE INVENTION

This invention is a hydraulic system for operating a tree processing implement having at least one grabber arm for holding a tree and at least one shear blade for severing the tree. Two hydraulic pumps are utilized for supplying pressurized fluid to respective hydraulic cylinders for operating the grabber arm and the shear blade jointly during the first part of a work cycle of the implement. The invention includes means responsive to the hydraulic pressure in the cylinders for disconnecting one of the pumps from both the grabber arm and the shear blade cylinders, leaving the other pump operating both the grabber arm and shear blade.

DESCRIPTION OF THE PREFERRED EMBODIMENT

Figure 1:
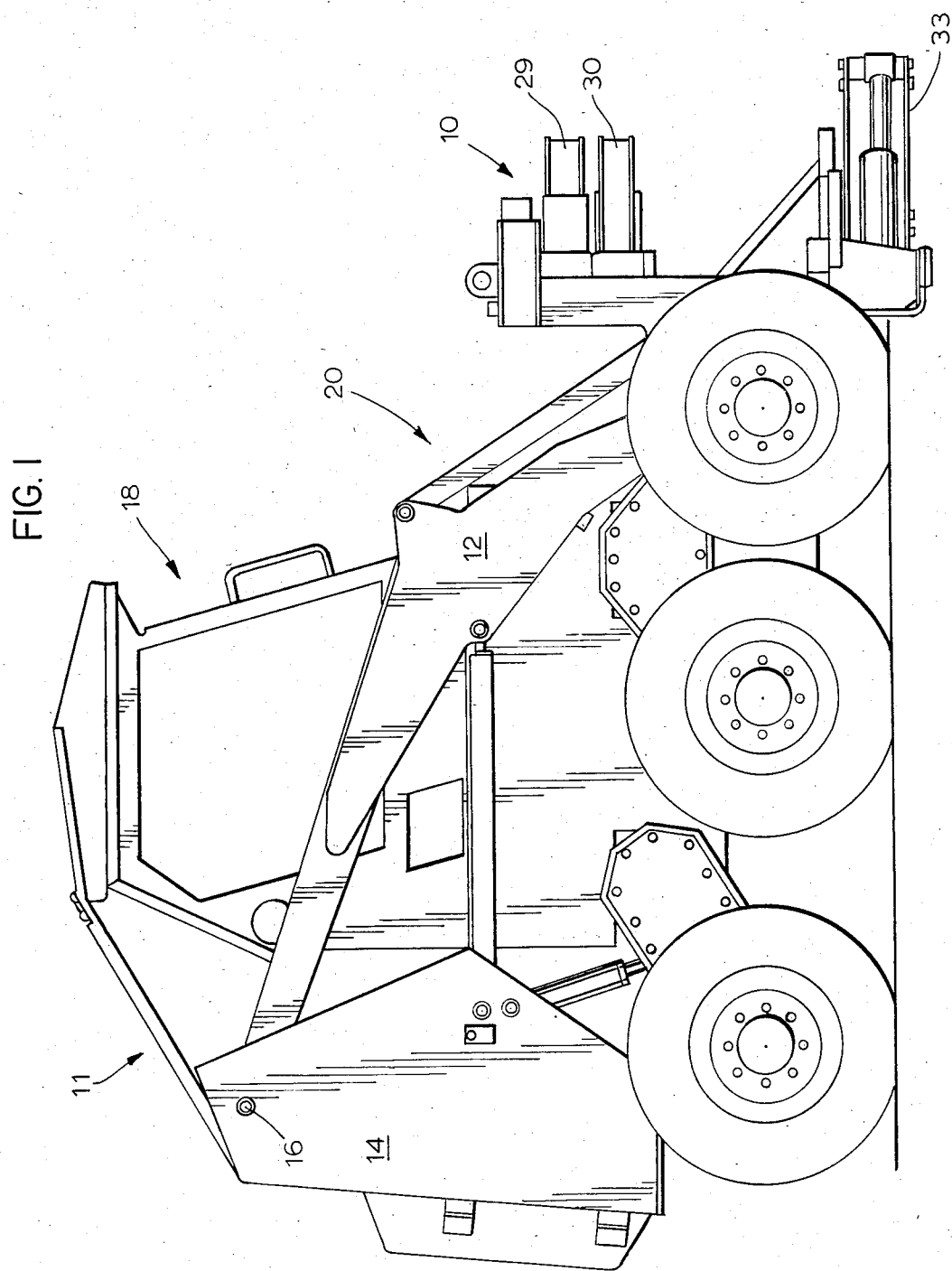
FIG. 1 of the drawing shows a felling head implement which may be operated in accordance with the present invention, mounted on a six wheel skid steer work vehicle.

FIG. 1 of the drawing shows an implement 10 utilizing the present invention, mounted on boom arms 12 which in turn are mounted on stanchion members 14 near the rear of the vehicle 11. The boom arms 12, one on each side of the vehicle, are pivoted upwardly and downwardly about a pivot axis 16 which extends between stanchion members 14 on opposite sides of the vehicle. The vehicle 11 includes an operator station 18.

Figure 2:
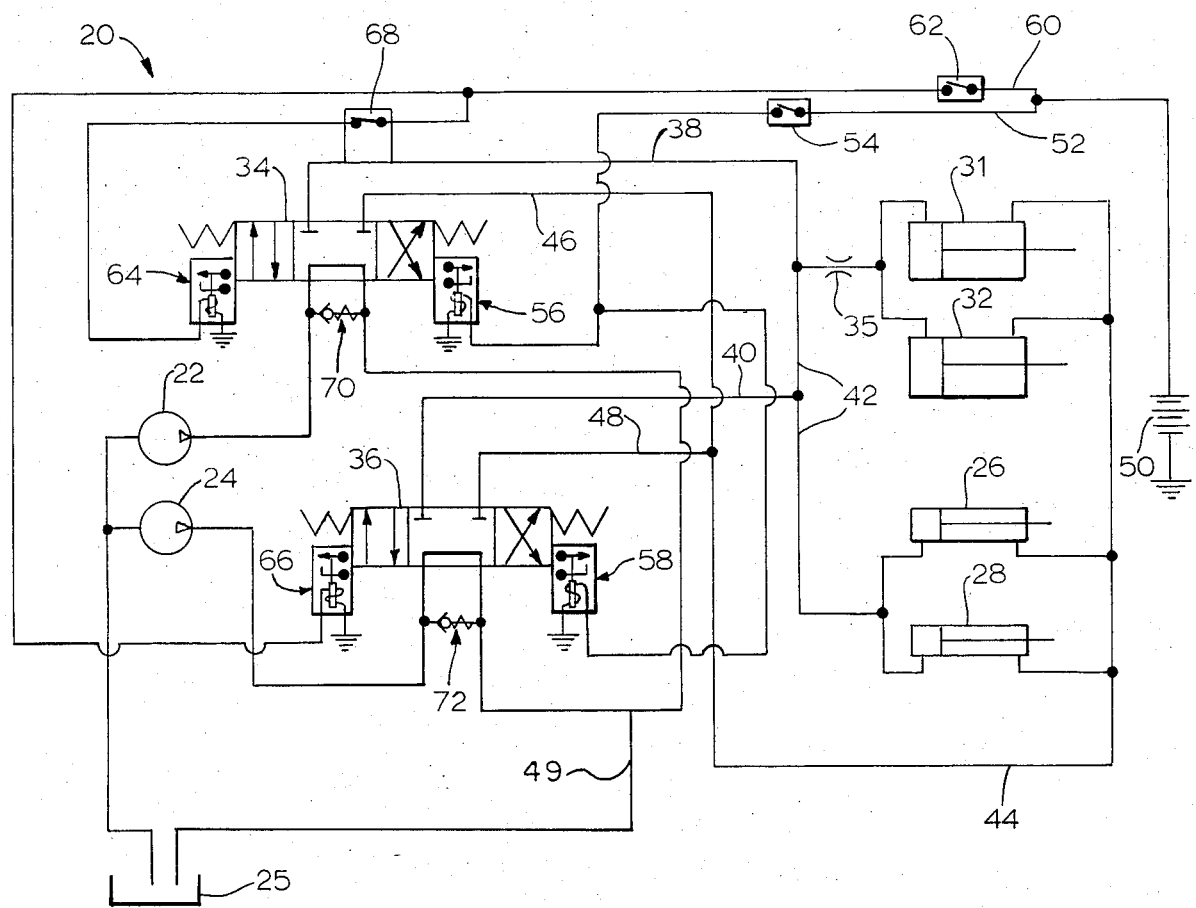
FIG. 2 is a combined hydraulic and electrical diagram illustrating this invention.

FIG. 2 of the drawing shows diagrammatically the hydraulic and electrical portions of a system 20 on the vehicle which under control of the vehicle operator operates the system of this invention to utilize the attachment 10 to first grasp a tree or trees and then operate a shear which severs the tree or trees from the stump or stumps.

The system 20 of this invention includes two fixed displacement gear pumps 22 and 24 which are driven by the prime mover of the vehicle. In a typical case the two pumps are not of the same capacity. The two pumps draw hydraulic fluid from reservoir 25. At the beginning of a cycle of operation both pumps 22 and 24 jointly supply two cylinders 26 and 28 which are connected respectively to a pair of grabber arms illustrated at 29 and 30 in FIG. 1. The two pumps 22 and 24 also supply jointly two cylinders 31 and 32 which operate two shear blades forming part of implement 10. Only one of the shear blades 33 is visible but the other is a mirror image located on the other side of the implement. A pair of control valves 36 and 34 respectively operate cylinders 26,28 and 31,32. Conduit 38 from pump 22 and conduit 40 from pump 24 are connected to common conduit 42 which supplies the head ends of both the grabber arm cylinders and the shear blade cylinders in parallel. Conduit 44 is the return line from all four cylinders back to conduits 46 and 48 respectively which connect with valves 34 and 36 and return the hydraulic fluid through conduit 49 to reservoir 25. During reverse operation conduit 44 is the supply line and common conduit 42 is the return line in the usual manner for an open center hydraulic circuit.

The control valves 34 and 36 are operated by an electrical pilot subsystem which includes a battery or other source of electrical energy 50. To initiate operation conductor 60 is connected through switch 62 to solenoids 64 and 66; switch 62 is operated by the operator of vehicle 11. In the circuit from switch 62 to solenoid 64 is a pressure switch 68 which is responsive to the hydraulic pressure in conduit 38 and common conduit 42. When switch 62 is closed valve 34 is operated by solenoid 64 and valve 36 is operated by solenoid 66 to jointly pressurize common conduit 42 and cause all four of the hydraulic cylinders 26, 28, 31 and 32 to extend at a rapid rate because the fluid flows from both pumps 22 and 24 are directed to the cylinders. When during the extension of the four cylinders, the pressure detected by pressure switch 68 exceeds a predetermined setting switch 68 opens the electrical circuit to solenoid 64, deenergizing it. Upon deenergization of solenoid 64 the spool in valve 34 returns to neutral which is the open center position illustrated on the drawing. In this condition, flow from pump 22 no longer is directed to the four cylinders, while pump 24 continues to supply them as long as switch 62 remains closed. The result is a hydraulic circuit wherein extension of the cylinders is accomplished rapidly until a predetermined high pressure is required to further extend the cylinders. Then cylinder extension is slowed in order to limit the applied power and thus avoid the excessive power consumption required to extend the cylinders rapidly at high pressure.

Orifice 35 indicates that the fluid flow to cylinders 31 and 32 is restricted sufficiently that the grabber cylinders 26,28 move more rapidly than shear cylinders 31,32 during each operation of the four hydraulic cylinders. It is desirable for the grabber arms to act more quickly than the shear in both the closing and opening directions.

In order to retract the cylinders switch 62 is opened and switch 54 is closed. Like switch 62 the switch 54 is operated by the operator of vehicle 11. Solenoids 56 and 58 are thus energized which causes the spools in valves 34 and 36 to direct fluid flow from pumps 22 and 24 to the rod ends of cylinders 31, 32, 26 and 28 so that all the cylinders retract. Pressure switch 68 is not involved during the cylinder retraction movement.

It will be appreciated that pumps 22 and 24 normally are sized properly to serve other hydraulic functions on the same work vehicle in addition to the grabber arms and the shear blades. These other hydraulic functions may be served by either pump 22 or pump 24 but not by a combined flow from both such pumps. This is accomplished through the use of additional valve spools, omitted from FIG. 2 for simplicity, which are in series with the spools of valves 34 and 36. Valves 70 and 72 are the main relief valves for the two parts of the system supplied by pump 22 and pump 24 respectively.

While we have described and illustrated herein the best mode contemplated for carrying out our invention it will be appreciated that modifications may be made. Accordingly it should be understood that we intend to cover by the appended claims all such modifications falling within the true spirit and scope of our invention. Hydraulic cylinder as used herein means a linear hydraulic motor having a closed outer barrel portion, with an axially moveable piston within the barrel portion forming variable volume chambers between the piston and the closed ends of the device respectively.

We claim:

1. A hydraulic system for operating a tree processing implement which has at least one grabber arm for holding a tree, and at least one shear blade for severing the tree, comprising
   a first hydraulic cylinder for operating said grabber arm,
   a second hydraulic cylinder for operating said shear blade, two hydraulic pumps for supplying pressurized fluid for jointly pressurizing said hydraulic cylinders for operating said grabber arm and said shear blade jointly during the first part of a work cycle of the implement, and
   means responsive to an increase in the hydraulic pressure applied to said hydraulic cylinders to a predetermined amount for disconnecting one of said pumps from both said cylinders,
   leaving the other pump operating both said arms.

2. A hydraulic system as in claim 1 for a tree processing implement which has a plurality of grabber arms, and a plurality of shear blades, comprising,
   a plurality of hydraulic cylinders equal to the number of grabber arms for operating said grabber arms respectively, and
   a plurality of hydraulic cylinders equal to the number of shear blades for operating said shear blades respectively.

3. A hydraulic system as in claim 1 which includes means for restricting hydraulic fluid flow to said second hydraulic cylinder sufficiently that said first hydraulic cylinder operates more rapidly than the second hydraulic cylinder.

4. A hydraulic system as in claim 1 which has electrical pilot controls.

5. A system for operating a tree processing implement which has a pair of grabber arms for holding a tree and a pair of shear blades for severing the tree, comprising
   a first pair of hydraulic cylinders for operating said grabber arms respectively,
   each of said first pair of hydraulic cylinders having a head end and a rod end,
   a second pair of hydraulic cylinders for operating said shear blades respectively,
   each of said second pair of hydraulic cylinders having a head end and a rod end,
   a common hydraulic conduit connected to the head ends of all four said hydraulic cylinders,
   two hydraulic pumps for supplying pressurized fluid to said common conduit and thereby pressurizing the said head ends of all four hydraulic cylinders,
   two three-position electrically controlled hydraulic valves for connecting said pumps for them to supply simultaneously said common hydraulic conduit,
   an electrical pilot circuit for said valves including a first electric switch which simultaneously operates said valves to jointly supply said common conduit,
   a second electric switch responsive to pressure in said common conduit for operating one of said valves to disconnect one pump from said common conduit, and
   a third electric switch for reversing both valves and jointly returning said grabber arms and said shear blades to their initial positions.

6. A system as in claim 5 which includes means for restricting hydraulic fluid flow to said second pair of hydraulic cylinders sufficiently that said first pair of hydraulic cylinders operate more rapidly than said second pair of hydraulic cylinders.

* * * * *